United States Patent [19]

Deeter et al.

[11] 4,021,126

[45] May 3, 1977

[54] LATCH MECHANISM FOR AUGER STRING COUPLINGS

[75] Inventors: Ronald C. Deeter, Malvern; Thad A. Lora; John M. Pozniko, both of Salem, all of Ohio

[73] Assignee: The Salem Tool Company, Salem, Ohio

[22] Filed: Sept. 18, 1975

[21] Appl. No.: 614,625

Related U.S. Application Data

[63] Continuation-in-part of Ser. No. 521,637, Nov. 7, 1974, Pat. No. 3,967,909.

[52] U.S. Cl. .................................. 403/9; 403/322; 248/408
[51] Int. Cl.² .......................................... F16D 7/00
[58] Field of Search .......... 403/322, 324, 328, 316, 403/9; 248/408

[56] References Cited

UNITED STATES PATENTS

| | | | |
|---|---|---|---|
| 2,061,448 | 11/1936 | Bath et al. | 403/328 |
| 2,659,413 | 11/1953 | Cramer | 248/408 |
| 2,909,212 | 10/1959 | Scherer | 248/408 |
| 3,443,784 | 5/1969 | Walkinshaw | 248/408 |
| 3,685,865 | 8/1972 | Young | 403/316 |
| 3,854,774 | 12/1974 | Limpach | 248/408 |

*Primary Examiner*—Andrew V. Kundrat
*Attorney, Agent, or Firm*—Bosworth, Sessions & McCoy

[57] ABSTRACT

A lever-operated latching device for securing in endwise coupled relation a socket portion and mating shank of axially aligned auger sections of an auger mining machine. The latching device is designed to be of minimum radial dimension so as to fit in a hole of limited radial cross section bored by the auger machine, and includes a latch pin that reciprocates in a passage formed in the socket portion between an extended position in latching engagement with the shank and a retracted unlatching position. The pin is biased by a spring toward its extended position and is retractable by a lever that engages a retractor element on the pin and that also acts as limit means that prevents the pin from extending beyond its extended latching position against the force of the spring. Openings are provided to permit removal by the latch pin of debris that could impair operative movement of the latch pin.

11 Claims, 9 Drawing Figures

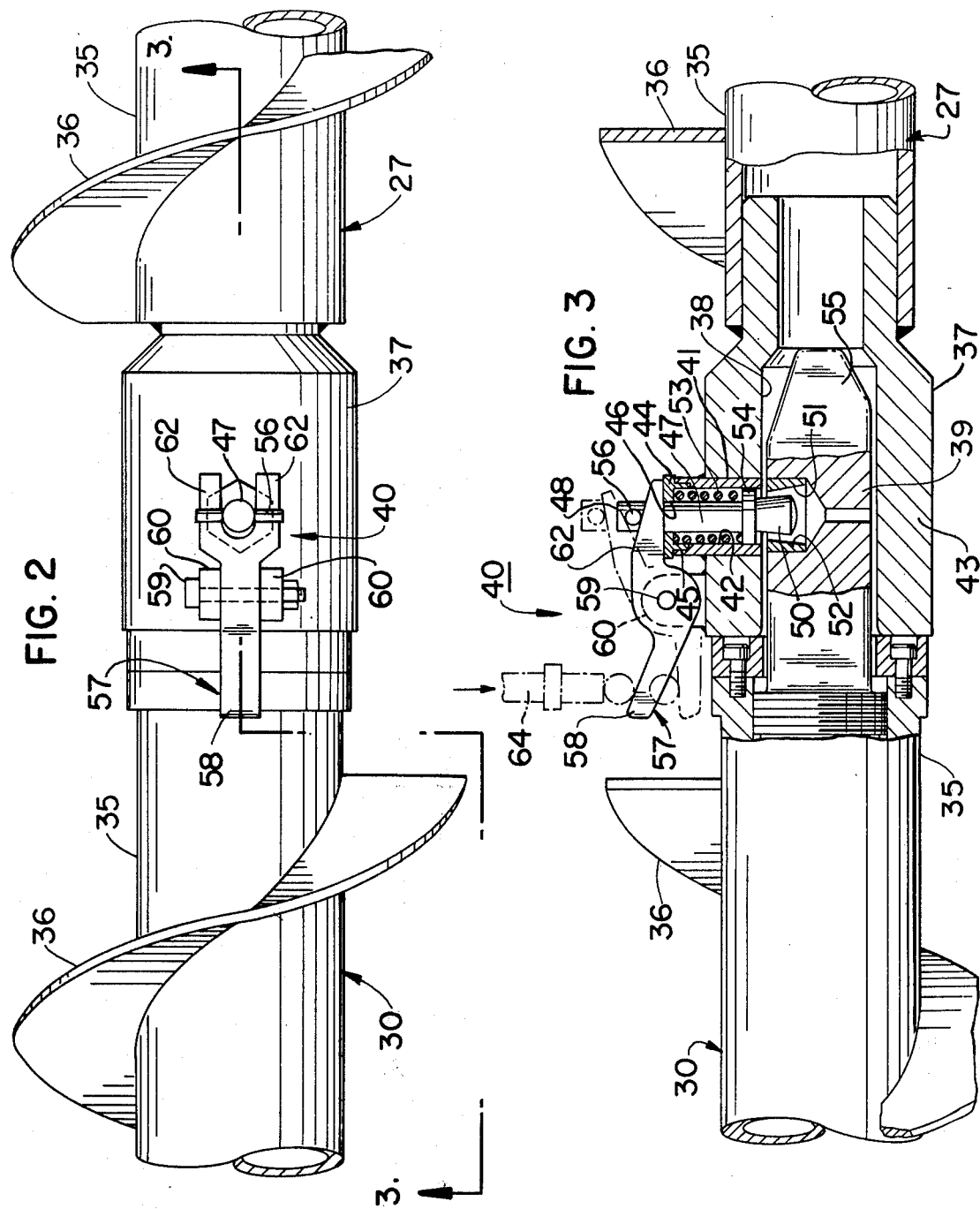

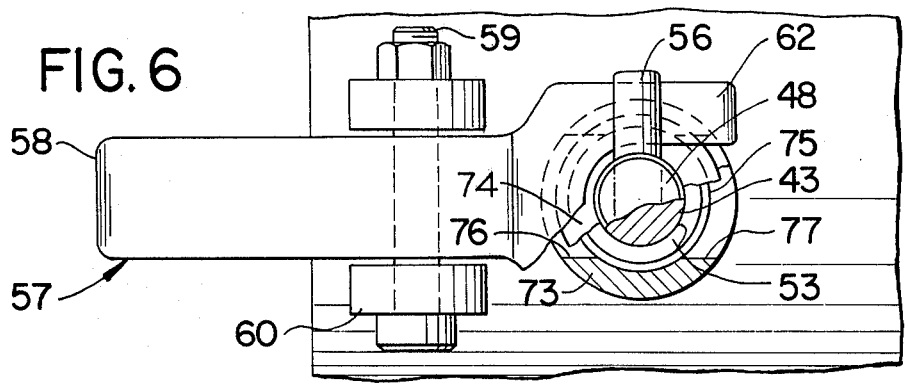
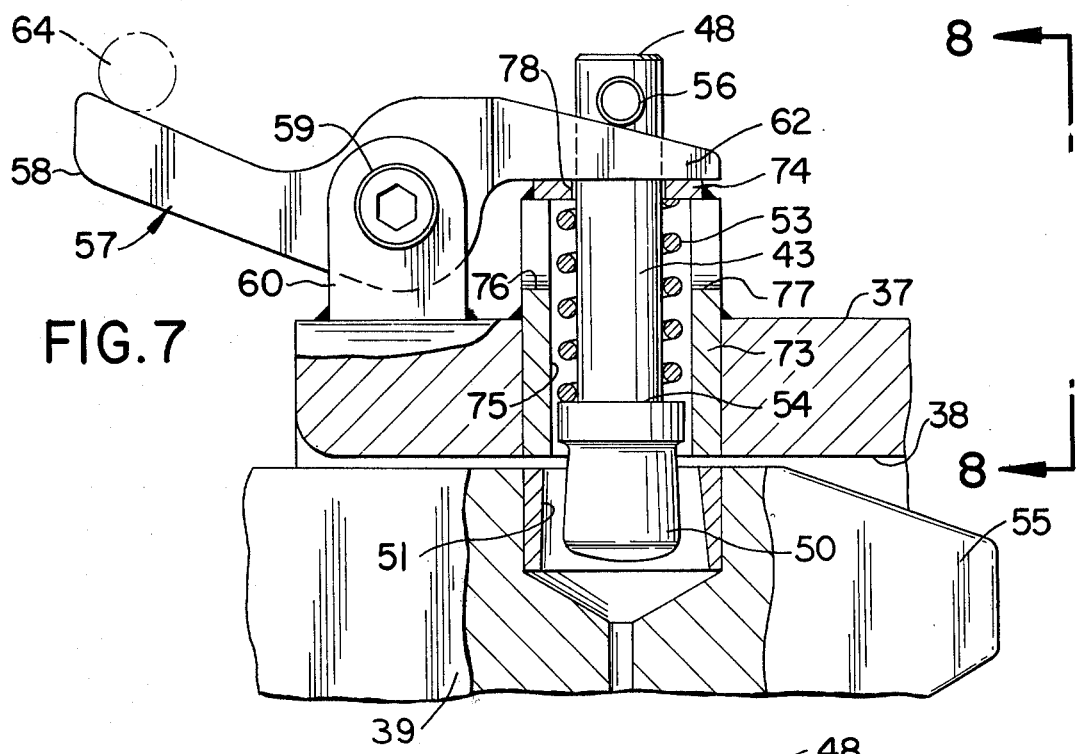
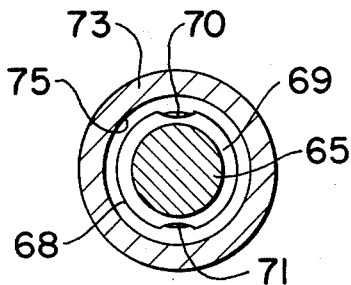
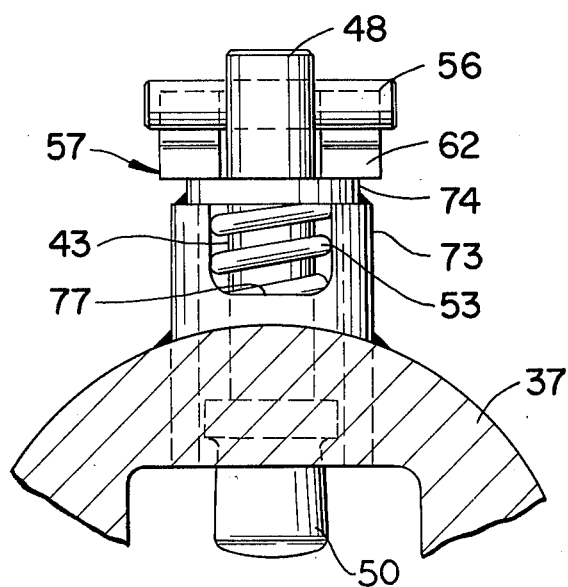

LATCH MECHANISM FOR AUGER STRING COUPLINGS

CROSS REFERENCE TO RELATED APPLICATION

This application is a continuation-in-part of our co-pending application Ser. No. 521,637, filed Nov. 7, 1974 and now U.S. Pat. No. 3,967,909 dated July 6, 1976.

BACKGROUND OF THE INVENTION

This invention relates to latching devices for securing shank-and-socket type couplings, such as for connecting auger sections used in auger mining machines to rotate a cutting head and progressively drive an auger assembly forward into a mineral deposit while removing the mined material with the auger strings. More particularly, the invention relates to a latching device of small radial dimension relative to the auger section to fit within the cross sectional limits of the hole being cut by the auger machine.

The invention has particular utility in connection with auger machines for mining lateral seams or veins of mineral, such as coal, and especially to a machine, usually located adjacent an open wall, that advances a rotary cutting head progressively laterally into the seam of coal while conveying the dislodged coal rearwardly from the cutting head with helical auger flights according to conventional practice. Additional auger sections are added as needed depending upon the extent of the advance of the cutting head into the coal seam, to form a string of endwise coupled auger sections corresponding to the depth of the hole.

Many such auger mining machines have multiple rotary cutting heads journaled in a rigid frame with their respective axes parallel and generally coplanar. The resulting assembly is advanced as a unit into the earth to cut a relatively wide hole as the mining progresses. Where multiple cutting heads are used, normally two or more separate strings of auger sections extend from the main body of the machine to the cutting head assembly to rotate the plurality of cutting heads simultaneously and to exert a thrust to advance the cutting heads into the mineral deposit to be mined.

New developments in the economics of coal mining have created conditions where it is now feasible to mine coal from relatively thin seams that in the past would have been bypassed as being economically unfeasible to mine. The relatively small diameters of the cutting heads and auger flights for mining such thin seams have necessitated the provision of associated equipment that will fit within the cross section of the hole through which the auger strings are advanced. This associated equipment includes the devices for latching the couplings between axially aligned endwise coupled auger sections in the auger strings.

Normally the interconnected auger sections have a socket portion on one end of each section and a cooperating mating shank on the opposite end. The shank fits into the socket recess of the next section, and a latch pin extending transversely of the auger axis extends through the wall of socket portion and into a recess formed in the shank. Such a connection is disclosed in U.S. Pat. No. 3,278,236. A lever is usually provided for retracting the latch pin from the shank to permit uncoupling of the section, as when the cutting head is being withdrawn from the hole at completion of the mining of the seam. As the auger string is withdrawn, the auger sections of each string must be sequentially removed from the machine by uncoupling the sections and lifting the rearmost section from the machine.

Prior art latching devices, however have not been sufficiently compact to permit their use in holes of smaller cross section that are now common.

Moreover, prior art latching devices are susceptible to being rendered inoperative by debris that enters the latching device and impairs operative movement of the latch pin.

The present invention resolves the difficulties indicated above and affords other features and advantages heretofore not obtainable.

SUMMARY OF THE INVENTION

An object of the invention is to reduce the space occupied by a latching device for connecting a socket to a mating shank, as in longitudinally connected auger sections, to permit the latching device to be effective even though its pin is moved a relatively small distance.

Another object is to provide a latching device, for endwise coupled auger sections, that extends radially a substantially lesser distance than prior unlatching devices to fit within the cross section of the hole through which such sections pass, even though the hole is of relatively small diameter.

Another object is to provide a latching device having recess means permitting removal of debris that could impair operative movement of the latch pin.

As many as desired of these and other objects may be accomplished by the present invention.

The latching device of the invention is located on a socket portion that has a socket recess adapted to receive a mating shank, and has means defining a passage extending transversely through the wall of the socket portion. The means defining the passage has retainer means at one end that defines an opening. A latch pin extends through the passage and has an actuating end portion projecting outwardly through the opening of the retainer means, and a latching end portion adapted to extend beyond the other end of the passage. The latch pin is reciprocable between an extended position in latching engagement with a latch recess in the shank, and a retracted unlatching position. The latch pin is biased by means, preferably a spring, located in the passage that bears against the retainer means and the pin to urge the latching end of the pin towards its extended latching position. Externally of the passage, the pin has retractor means.

The pin is retracted by pin actuating means, preferably a lever, mounted on the socket with a pin-engaging arm end located between the retractor means on the pin and the retainer means. The pin-actuating means is adapted to cause its pin-engaging arm to move to a retracting position whenever it lifts the pin, by pressure against the retractor means, to the pin's retracted unlatching position, and a retaining position wherein the pin-engaging arm engages both the retractor means and the retainer means and prevents further movement of the retractor means so as to prevent movement of the latching end portion of the pin beyond its extended latching position. This arrangement minimizes the outward projection of the latch pin so that the entire device occupies a minimum amount of space.

Preferably, the means defining the passage has recess means permitting removal of debris that may enter the passage and could otherwise impair operative movement of the latch pin.

BRIEF DESCRIPTION OF THE DRAWINGS

FIG. 2 is a fragmentary plan view on a larger scale illustrating a latching device embodying the invention;

FIG. 3 is a fragmentary sectional view taken on the line 3—3 of FIG. 2 and to the same scale;

FIG. 6 is a fragmentary plan view of another modified form of the latching device of the invention with parts broken away and shown in section for the purpose of illustration;

FIG. 7 is a fragmentary side elevation of the device of FIG. 6 with parts broken away and shown in section for the purpose of illustration;

FIG. 8 is a fragmentary sectional view taken on the line 8—8 of FIG. 7; and

FIG. 9 is a cross sectional view of a modification of the latching device of FIGS. 6–8, along a section similar to that of FIG. 5 for FIG. 4.

DESCRIPTION OF THE PREFERRED EMBODIMENT

Figure 1:
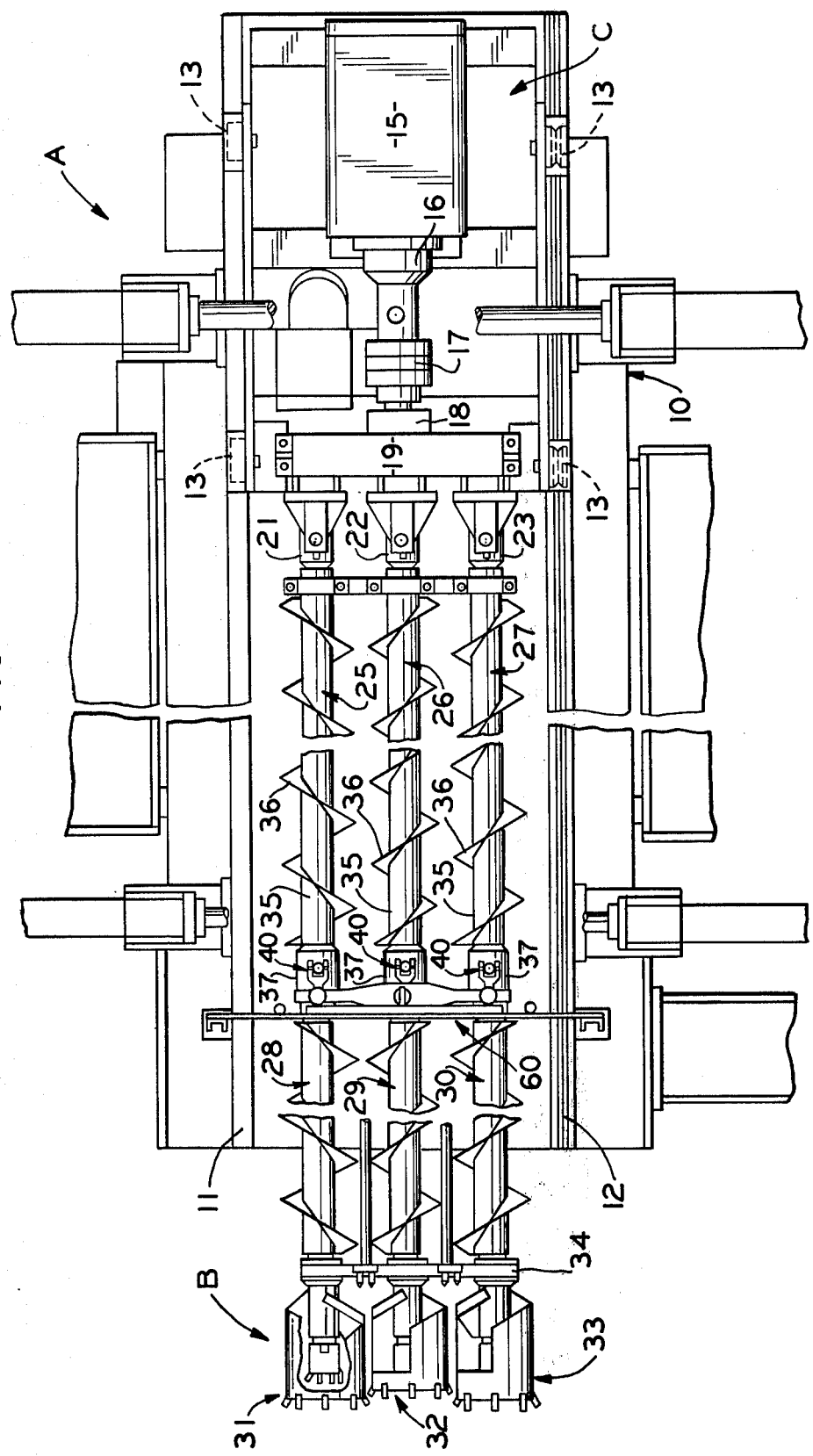
FIG. 1 is a broken plan view to a greatly reduced scale of an auger mining machine embodying the invention, useful for mining coal and having three auger strings connected to a single driving carriage.

In the drawings, (FIGS. 1, 2 and 3) there is shown an auger-mining machine A for mining minerals such as coal from an open pit. The machine A has a multiple cutting head assembly B which is advanced laterally into a seam of coal by a reciprocable carriage C. The machine A has a main frame 10 of known construction with a pair of parallel ways or rails 11 and 12 thereon along which the carriage C travels on wheels 13.

An internal combustion engine 15, constituting a power source for rotating the augers, is mounted on the carriage C and drives the below-discussed augers through a power train including a clutch 16, a flexible coupling 17 and a shiftable transmission 18. The output shaft of the coupling 17 is operatively connected to the transmission 18 and a gear box 19 adapted to drive three driving heads 21, 22 and 23 forming part of carriage C and rotatable about parallel coplanar axes.

The driving heads are each connected to one of three parallel auxiliary auger sections 25, 26 and 27 which are axially coupled to another three parallel auger sections 28, 29 and 30 forming part of three auger strings extending to the three individual cutting heads 31, 32 and 33 of the cutting head assembly B, which may be known construction. The assembly B has a rigid frame 34 in which the three cutting heads 31, 32 and 33 are journaled for rotation about parallel axes in a generally common plane.

Each of the auxiliary auger sections 25, 26, 27, 28, 29 and 30 comprises (FIGS. 2 and 3) an elongated body 35 with external helically vaned flights 36 secured thereon as by welding, a socket portion 37 having a cross-section recess 38 that is polygonal, preferably square, at the forward end of body 35, and at the rearward end of body 35 a shank 39 that is of matching-mating cross section and adapted to slidably but non-rotatably fit into recess 38. Thus, pairs of axially aligned auger sections may be interconnected or coupled to one another end-to-end by inserting the shank 39 of one section into the mating socket recess 38 of the other section and securing the shank and socket against substantial relative axial movement.

At the start of the mining operation as shown in FIG. 1, the cutting head units 31, 32 and 33 of cutting head assembly B are respectively coaxially aligned end-to-end and coupled directly to the three auger sections 25, 26, 27 that are connected to the driving heads 21, 22 and 23. However, after the assembly B and its cutting head units 31, 32 and 33 have advanced sufficiently into the vein of mineral to be mined, the driving heads are disconnected, the carriage C is retracted and three new auger sections are inserted and connected to the sockets of the former rearmost auger sections in the string. As this progressive adding of additioal auger sections continues, a relatively long string of auger sections is constructed. On withdrawal of the cutting head assembly B from the hole, the rearmost auger sections are sequentially unlatched and removed from each strip.

A novel latching device embodying the invention is provided to hold the auger sections together. In the mining machine illustrated in FIGS. 1–3, the cutting head assemblies 31, 32 and 33 cut three circular holes of about 16 inch diameter. For this reason the space available for each latching device is somewhat limited, as it must be capable of advancing forward with the auger sections through a hole having only such diameter. The unique construction of the latching device in accordance with the invention minimizes the space required for effective latching and thus is capable of meeting the requirements of relatively small diameter mining equipment.

Figure 4:
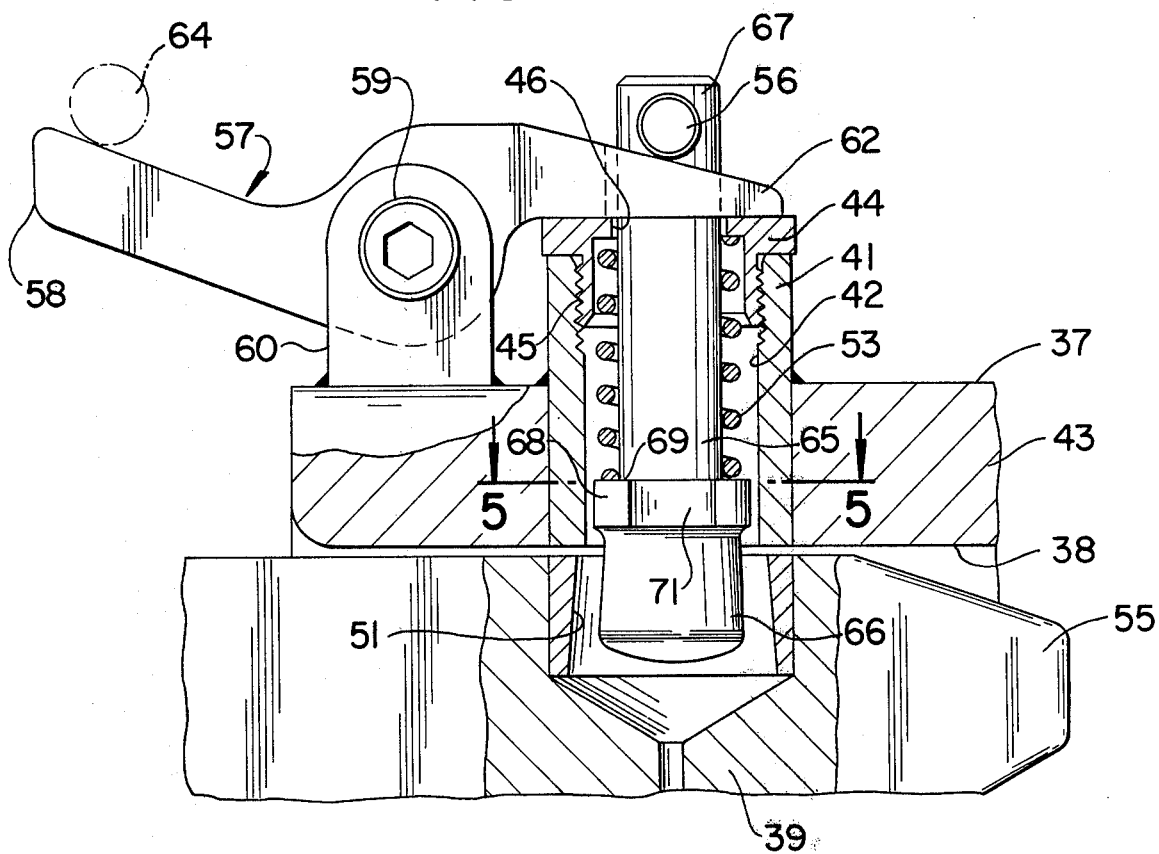
FIG. 4 is a fragmentary elevational view on an enlarged scale with parts broken away and shown in section, illustrating a modification of the latching device of FIG. 3.

Each latching device 40 of FIGS. 2 and 3 comprises a housing 41, defining a cylindrical passage 42, fixed in a radial hole in wall 43, of socket portion 37 at the forward end of an auger section, which in FIGS. 3 and 4 is section 27. The socket 38, shown of square cross section, is adapted to receive the square cross section shank 39 of an adjacent auger section, shown as section 30 in FIGS. 2 and 3. Shank 39 has a cross section that matches but is slightly smaller than that of socket 38. Passage 42 opens into one of the flat sides of socket 38.

The housing 41 has a retainer 44 fixed, as by threads 45, to the outer end of housing 41 defining a central opening 46 adapted to receive a latch pin 47 that can reciprocate in passage 42 of housing 41. Pin 47 has an actuating end portion 48 that extends through the opening in the retainer 44 radially outwardly away from the exterior of socket portion 37. Latch pin 47 has at its other end a latching end portion 50 having an outer surface tapered inwardly toward the outer end of the pin, and adapted to extend into a latch hole 51 in the shank 39 of connected auger section 30, which hole 51 is alignable with passage 42. Hole 51 has its inner surface tapered inward toward the outer end of the hole to cooperate with the tapered surface of the latch pin portion 50 to prevent any accidental unlatching that might occur from the forces involved during the mining operation or on withdrawal of the auger strings. Preferably, hole 51 is formed in a sleeve 52 of hard metal inset into and secured in shank 39. A coil spring 53 located in passage 42 of housing 41 and compressed between a shoulder 54 on the latch pin adjacent the latch pin portion 50 and the interior of the retainer 44 biases the latch pin 47 to its extended latching position wherein its portion 50 extends into the hole 51 in shank 39.

It will be noted that the shank 39 has a tapered outer end 55 and that during the coupling operation the movement of the shank 39 into the socket 38 results in engagement between the tapered end of the shank 39 and the end of latch pin 47 and moves it upwardly against the force of the spring 53 until the pin 47 becomes aligned with the latch pin hole 51 at which time the spring forces the latching end portion 50 of pin 47 into hole 51 to cause latching engagement with the shank 39. Accordingly, the coupling operation results in an automatic latching of the aligned auger sections in the particular auger string.

The latch pin 47 has a laterally extending retractor pin 56 secured in its actuating end portion 48 to permit retraction of the latch pin 47 when the sections are to be uncoupled. Retraction of the pin against the force of the spring 53 is accomplished by a lever 57 having an operating arm 58 at one end and connected by a pivot pin 59 to a clevis 60 welded to the socket portion 37. The lever has another pin-engaging arm 62 with a bifurcated end.

As indicated in FIGS. 2 and 3 the bifurcated pin engaging arm 62 extends on each side of the upper actuating end portion 48 of latch pin 47 between the opposite ends of the retractor pin 56 and the outer face of the retainer 44. Therefore, when the lever 57 and its retractor arm 62 are in its normal retaining position shown in full lines in FIG. 3, arm 62 blocks further extension of the latch pin 47 into the hole 51 in shank 39 and thus serves as a positive stop to prevent the force of the spring 53 from moving the latch pin 47 into further extension. When the operating arm 58 is depressed by latch releasing means 64, as by the means disclosed in U.S. Pat. No. 3,278,236 or in applicants' copending U.S. Pat. No. 3,967,909 the pin engaging arm 62 lifts the retractor pin 56 together with the latch pin 47 to retract portion 50 of the latch pin 47 from the hole 51 in the shank 39 and permit the shank 39 to be moved axially out of the socket to unlatch the two interconnected auger sections so that they may be axially separated, thus uncoupling them.

Figure 5:
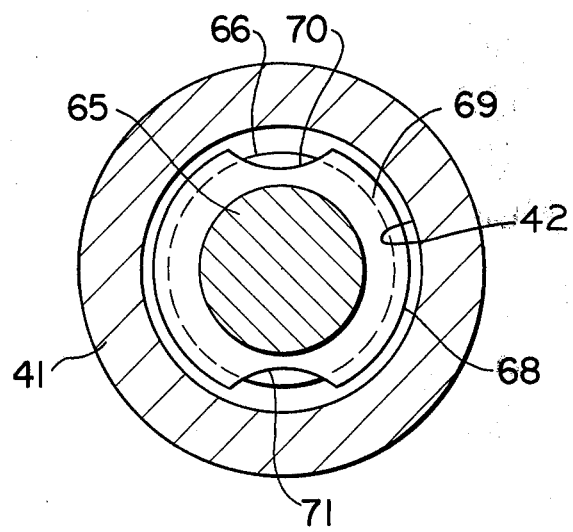
FIG. 5 is a fragmentary sectional view taken on the line 5—5 of FIG. 4.

FIGS. 4 and 5 illustrate on a larger scale a slightly modified version of the latching device of FIGS. 1 to 3. In these figures, parts like those of FIGS. 1–3 have like reference characters, but a latch pin 65 of an alternative construction is utilized instead of the latch pin 47 of the preceding Figures. The latch pin 65 has a latching end portion 66 adapted to be moved into latching engagement in the latch pin hole 51 of the shank 39 by spring 53, and to be lifted out of latching engagement by lever 58 having pin-engaging arm 62 located between retractor pin 56 on actuating end portion 67 of pin 65, and retainer 44. Pin 65 has a fixed flange portion 68 adjacent to, and of equal diameter to the latching end portion 66 of the pin 65. As in the previous embodiment, the diameter of flange portion 68 is somewhat smaller than the inner diameter of passage 42 in housing 41 and approximates it in cross section; and the flange portion serves to guide the pin on housing 41 and also serves as a seat 69 against which bears one end of the coil compression spring 53; the other end of the spring bears against and is located by retainer 44.

Flange portion 68 has two oppositely located indented or recessed portions 70 and 71. These portions permit finely divided debris, such as dirt, rock, or material being mined such as coal, which may have entered the passage 42, to pass the flange portion when the pin 65 is forced upward to the unlatched position. Such debris could enter passage 42 through retainer opening 46 or between the surfaces of the socket 38 and shank 39.

While this modification will be helpful in some cases, it may not be desirable in others since it does not make possible ready removal of the debris from passage 42, and may cause debris to pack in passage 42 sufficiently to prevent satisfactory unlatching.

FIGS. 6, 7 and 8 illustrate still another modified form of the invention having provision for permitting the removal and escape of finely divided debris that could clog the passage in the interior of the housing in which the latch pin 43 is intended to reciprocate. The latching device of FIGS. 6–8 is similar to that of FIGS. 1–3 except that it has a modified housing 73 illustrated as having fixed to its outer end a modified retainer 74 that differs from the threadedly attached retainer of the previous embodiment in that it is welded to the outer end of the housing. The housing 73 has a passage 75 through which pin 43 extends and in which it is biased toward latching position by compression spring 53 bearing against retainer 74 and shoulder 54 on the pin 43. Housing 73 also has a pair of diametrically opposed openings 76 and 77, of substantial area, located at the upper end of the housing 73 inwardly of retainer 74 and externally of the socket portion 37. The slots 76 and 77 permit debris that may enter the housing passage 75 through opening 78 of the retainer or between the socket and shank to be ejected by the pin 43 when it is moved radially outwardly to unlatching position by pin engaging arm 62 which is fixed about the pivot 59 of lever 57 by latch releasing means 64. When the pin is raised by the pin engaging lever arm 62 the shoulder 54 of the pin 43 moves upward, forcing along with it any debris that has entered the passage 75 of housing 73. Raising of the pin 43 can be repeated to cause a pumping action. Raising of the pin forces the debris out through the openings 76 and 77, and thus reduces the possibility of interference with the operation of the latching device that might otherwise be caused by the debris since attaching the retainer 74 to the end of the housing as by welding, rather than by threaded portions, permits more space for openings 76 and 77, and thus facilitates removal of debris.

This arrangement is particularly advantageous in auger-type mining operations where considerable amounts of dirt and dust are generated.

FIG. 9 illustrates a modification of the latching apparatus of FIGS. 6–8. In this embodiment, all parts are the same as in FIGS. 6–8, except that the latch pin is like that of FIGS. 4 and 5, having a flange portion 68 with recesses 70 and 71. Under certain conditions the combination of the recesses 76 and 77 in the housing 73, and recesses 71 and 72 in the pin flange portion 68, can provide special benefits in clearing the latching device of harmful debris that could impair operation of the device.

While the invention has been shown and described in respect to specific embodiments thereof, this is intended for the purpose of illustration rather than limitation and other variations and modifications of the specific devices herein shown and described will be apparent to those skilled in the art all within the intended spirit and scope of the invention. Accordingly, the patent is not to be limited to the specific devices herein shown and described nor any other way that is inconsistent with the extent to which the progress in the art has been advanced by the invention.

We claim:

1. A latching device for securing in endwise coupled relation socket means and mating shank means of rotatable auger sections, in which said shank means has a latch hole that extends transversely into said shank means and has a side extending transversely of said shank means, and in which said socket means has a surrounding wall having an exterior, said latching device comprising: means defining a passage extending transversely through said surrounding wall of said socket means; retainer means at the outer end of said passage and adjacent the outer surface of said socket means; a latch pin extending through said passage and having an actuating end portion projecting outwardly through said retainer means, retractor means on said actuating end portion of said latch pin outside of said passage and adjacent saidd retainer means, and an opposite latching end portion, said latch pin being movable in said passage between an extended latching position in which said latching end portion is in said latch hole of said shank means in latching engagement with said side of said latch hole and a retracted unlatching position in which said latching end portion is disengaged from said latch hole, said latch pin having a transverse shoulder thereon that approximates in cross section the cross section of said passage and that is located on said latch pin so it is fixed on said latch pin adjacent its latching end portion and also so said shoulder is positioned in said passage a substantial distance away from said retainer means when said latch pin is in its retracted position, to provide a clearance portion of said passage; means for biasing said latch pin toward said extended latching position; means mounted on said socket means and having a pin-engaging arm that is interposed between said retractor means and said retainer means and that is adapted to be moved between an unlatching position wherein said pin-engaging arm moves said latch pin against the force exerted by said biasing means to said retracted unlatching position of said latch pin, and a latching position wherein said latching end portion of said latch pin is in said latching engagement in said latch hole and said pin-engaging arm engages both said retractor means on said pin and said retainer means and solely by such engagement prevents any movement by said biasing means of said latching end portion of said latch pin either toward its said unlatching position or beyond its extended latching position, although said latch hole extends into said shank means to a depth beyond said extended latching position of said latch pin so said latching end portion of said patch pin can contact only the side of said latch hole when said latching end portion is in its extended latching position; and opening means communicating with said exterior of said surrounding wall of said socket means at a location adjacent to said passage and with the interior of said passage at a location in said clearance portion of said passage, to permit debris in said passage to be pushed by said shoulder into said clearance portion of said passage and out of said passage through said opening means to said exterior of said surrounding wall of said socket means by said shoulder means as said latch pin is moved to its said retracted unlatching position.

2. A latching device as in claim 1 wherein said means mounted on said socket means is lever means pivotally mounted on said socket means and comprising said pin-engaging arm and means by which said lever means may be actuated to move said pin-engaging arm to said unlatching position, said lever means being at all times spaced from said socket means.

3. A latching device as in claim 1 wherein said biasing means comprises a helical compression spring positioned around said latch pin and bearing against said retainer means and spring bearing means on said latch pin.

4. A latching device as in claim 3 wherein said spring bearing means on said latch pin is said transverse shoulder on said latch pin and wherein one end of said helical spring bears against said shoulder.

5. A latching device as in claim 1 wherein said passage is generally circular in cross section and said shoulder is located in said passage and has a cross section that conforms generally to the cross section of said passage.

6. A latching device as in claim 1 wherein said retractor means comprises retractor pin means projecting transversely from said latch pin.

7. A latching device as in claim 6 wherein said retractor pin means projects transversely from opposite sides of said latch pin, and said pin-engaging arm of said lever means has a bifurcated portion that extends between said retractor pin means and said retainer means.

8. A latching device for securing in endwise coupled relation socket means and mating shank means of auger sections, said socket means having a surrounding wall having an exterior, said latching device comprising: means defining a passage extending transversely through said surrounding wall of said socket means; retainer means at the outer end of said passage adjacent the outer surface of said wall of said socket means; a latch pin extending through said passage and having an actuating end portion projecting outwardly through said retainer means, retractor means on said actuating end portion of said latch pin outside of said passage, and an opposite latching end portion, said latch pin being movable between an extended latching position in which its latching end portion is in latching engagement with said shank means and a retracted unlatching portion in which its latching end portion is disengaged from said shank means, said latch pin having a transverse shoulder thereon that approximates in cross section the cross section of said passage and that is located on said latch pin so it is fixed on said latch pin adjacent its latching end portion and also so said shoulder is positioned in said passage a substantial distance away from said retainer means when said latch pin is in its retracted position to provide a clearance portion of said passage; means for biasing said latch pin toward its said extended latching position; means mounted on said socket means and having pin-engaging means adapted to engage said retractor means and move said latch pin against the force exerted by said biasing means to its said retracted unlatching position; and opening means communicating with said exterior of said surrounding wall of said socket means at a location adjacent to said passage and with the interior of said passage at a location in said clearance portion of said passage, to permit debris in said passage to be pushed by said shoulder into said clearance portion of said passage and out of said passage through said opening means to said exterior of said surrounding wall of said socket means by said shoulder means as said latch pin is moved to its said retracted unlatching position.

9. The apparatus of claim 8 in which said pin-engaging means is interposed between said retractor means and said retainer means and is adapted to be moved between an unlatching position wherein said pin-engaging means moves said latch pin against the force exerted by said biasing means to said retracted unlatching position, and a latching position wherein said latching end portion of said latch pin is in said latching engagement with said shank means and said pin-engaging means engages both said retractor means on said pin and said retainer means and solely by such engagement prevents any movement by said biasing means of the latching end portion of said latch pin either toward its said unlatching position or beyond its said extended latching position.

10. A latching device for securing in endwise coupled relation socket means and mating shank means of auger sections, comprising: means defining a passage extending transversely through a surrounding wall of said socket means and comprising a housing extending generally radially from the exterior surface of said socket means; retainer means at the outer end of said passage and the outer end of said housing and adjacent the outer surface of said socket means; a latch pin extending through said passage and having an actuating end portion projecting outwardly through said retainer means, retractor means on said actuating end portion of said latch pin outside of said passage, and an opposite latching end portion, said latch pin being movable in said passage between an extended latching position in which said latching end portion is in latching engagement with said shank means and a retracted unlatching position in which said latching end portion is disengaged from said shank means, said latch pin having a shoulder thereon that is adjacent said latching end portion and that is in, and approximates in cross section the cross section of, said passage; means in said passage bearing against said latch pin and said retainer means for biasing said latch pin towards its said extended latching position; means mounted on said socket means having pin-engaging means adapted to engage said retractor means and move said latch pin against the force exerted by said biasing means to its said retracted unlatching position; and opening means communicating with the interior of said passage and the exterior of said housing in the portion of said housing that extends beyond the surface of said socket means, to permit debris in said passage to be pushed out of said passage by said shoulder means as said latch pin is moved to its retracted unlatching position.

11. The apparatus of claim 10 in which said pin-engaging means is interposed between said retractor means and said retainer means and is adapted to be moved between an unlatching position wherein said pin-engaging means moves said latch pin against the force exerted by said biasing means to said retracted unlatching position, and a latching position wherein said latching end portion of said latch pin is in said latching engagement with said shank means and said pin-engaging means engages both said retractor means on said pin and said retainer means and solely by such engagement prevents any movement by said biasing means of the latching end portion of said latch pin either toward its said unlatching position or beyond its said extended latching position.

* * * * *